US006186020B1

(12) United States Patent
Butsch

(10) Patent No.: US 6,186,020 B1
(45) Date of Patent: Feb. 13, 2001

(54) DEVICE FOR CONVERSION OF ROTARY INTO AXIAL MOVEMENT

(75) Inventor: Michael Butsch, Daisendorf (DE)

(73) Assignee: Wittenstein GmbH & Co., Igersheim (DE)

( * ) Notice: Under 35 U.S.C. 154(b), the term of this patent shall be extended for 0 days.

(21) Appl. No.: 09/051,350

(22) PCT Filed: Dec. 23, 1996

(86) PCT No.: PCT/DE96/02507

§ 371 Date: Apr. 7, 1998

§ 102(e) Date: Apr. 7, 1998

(87) PCT Pub. No.: WO97/25554

PCT Pub. Date: Jul. 17, 1997

(30) Foreign Application Priority Data

Jan. 5, 1996 (DE) .............................. 196 00 238

(51) Int. Cl.[7] .................................................. F16H 25/20
(52) U.S. Cl. ........................................................ 74/424.8 C
(58) Field of Search ................................... 475/149, 344, 475/317, 331; 74/424.8 C, 459

(56) References Cited

U.S. PATENT DOCUMENTS 3,861,221   1/1975  Stanley .
4,337,671 * 7/1982  Ulf ................................. 74/424.8 C
4,576,057 * 3/1986  Saari .............................. 74/424.8 C
4,964,314 * 10/1990 Wilkes ........................... 74/424.8 C
5,501,117 * 3/1996  Mensing et al. ............... 74/421 A X

FOREIGN PATENT DOCUMENTS 25 02 052   10/1975  (DE) .
36 29 281    3/1988  (DE) .
85 30 837    9/1988  (DE) .
 1540855     8/1968  (FR) .

* cited by examiner

Primary Examiner—Charles A Marmor
Assistant Examiner—Ankur Parekh
(74) Attorney, Agent, or Firm—Collard & Roe, P.C.

(57) ABSTRACT

The invention concerns a device for the conversion of rotary into axial movement with planet rollers supported at an equal peripheral distance and driven by a drive shaft, and with a thrust body that is axially-displaceable through the planet rollers which are supported to be rotatable around their fixed axes in an axle-driven carrier and with drive groove via which the planet rollers, driven by their carrier, engage in at least one screw-type groove on the thrust body which is displaceable along the axis of the carrier; the device should be of simple construction and have as low a frictional loss arising from the movement conversion as possible. For this purpose, the carrier is fixed to the drive shaft rotating in its axle. There is no power transmission during movement conversion between the drive shaft and the carrier via the parts that are tooth-engaged in one another.

6 Claims, 2 Drawing Sheets

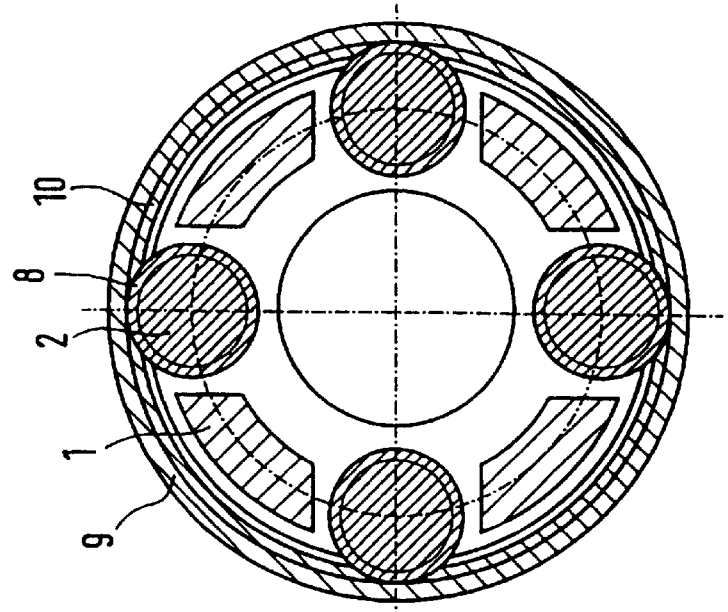
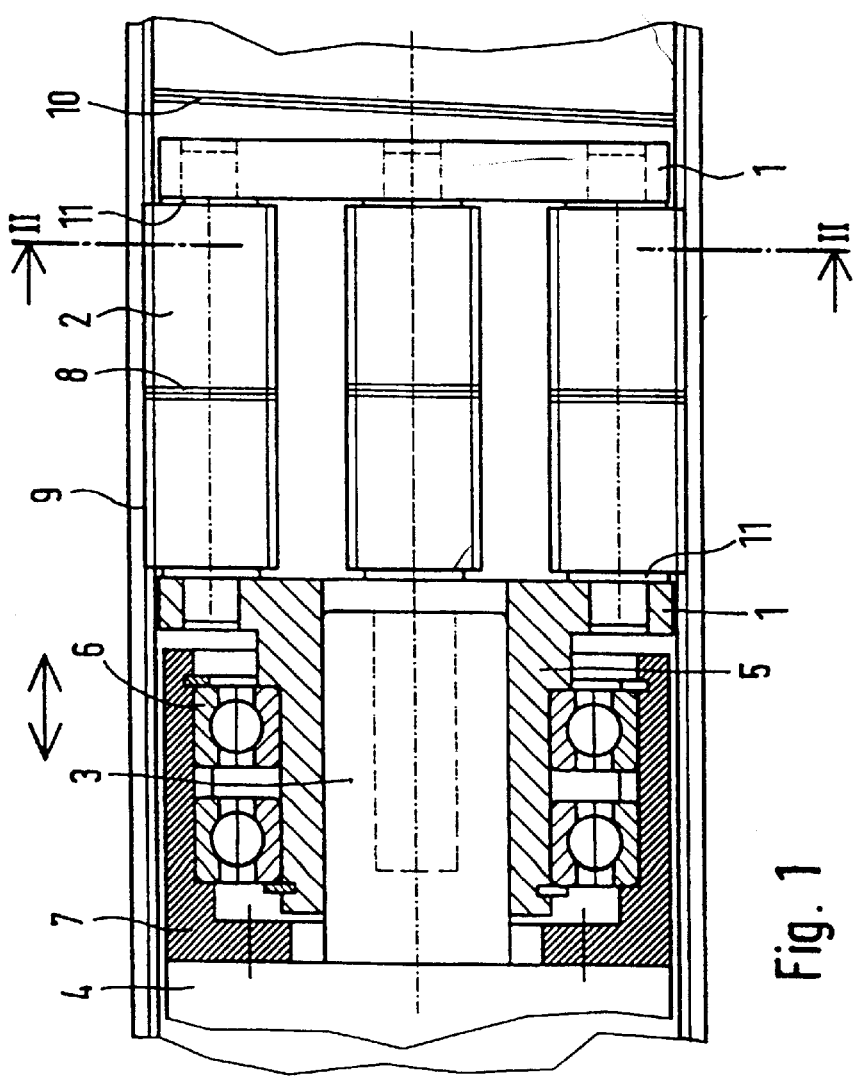
Fig. 2
Fig. 1

DEVICE FOR CONVERSION OF ROTARY INTO AXIAL MOVEMENT

BACKGROUND OF THE INVENTION

1. Field of the Invention

The invention relates to a device for converting rotary motion into axial motion, in accordance.

2. The Prior Art

Such a device is known from DE 25 02 052 C2.

A similar device is described in DE 36 29 281 A1. However, in that document, differing from the abovementioned device, the planet rollers have a threaded groove as profiling. Threaded groove profiling of this type rules out any slip between the planet rollers and the thread of the thrust element.

A device for converting rotary motion into axial motion is known from U.S. Pat. No. 3,861,221, in which device a threaded rod acts on planet rollers mounted in a planet carrier. In this case, the threaded rod and the planet wheels have threads that are matched to one another. The thrust element is displaced axially by a hollow wheel that is supported axially on this thrust element and in which the planet rollers roll.

Proceeding from the device according to DE 25 02 052 C2, the invention is concerned with the problem of providing a device of the generic type that is of more simple construction and functions with less friction.

SUMMARY OF THE INVENTION

This problem is solved by a design of such a device according to the defining features of patent claim 1.

The invention is primarily based on the idea of mounting the planet rollers in a carrier which is driven by a shaft which is firmly connected to this carrier, and of profiling said planet rollers in such a way that slip-free transmission of the rotary motion into axial motion of the thrust element is ensured.

As a result, in the case of the solution according to the invention, slip therefore cannot occur. This results from the following. The carrier rotates without slip. The axles of the planet rollers rotate therewith, likewise without slip. As a result, the drive grooves of the planet rollers—even if they were to slip in an intrinsically undesired manner in the thread of the thrust element—are always definitely assigned in the axial direction to the thread of the thrust element.

The drive grooves of the planet rollers must be grooves which are located separately alongside one another, are each closed in the circumferencial direction, and have no pitch, in order to avoid stresses if any—intrinsically undesirable—slip should occur between a planet roller and the thrust element driven thereby. With regard to possible slip between a planet roller and thrust element, it should be noted once more that such slip does not as a result signify any slip between the rotary drive of the carrier and the thrust element.

Rather, the only significance of any—intrinsically unintentional—slip between a planet roller and the thrust element is that, during the occurrence of such slip between the relevant planet roller and the thrust element, sliding friction occurs instead of rolling friction, which occurs when there is no slip. Were such slip not possible, as is the case, for example, of the prior art mentioned in the device according to the specification DE 26 29 281 A1 acknowledged at the beginning as the prior art, then jamming of the force-transmitting parts may occur. Such designs which rule out slip between plant wheels and thrust element cannot be used functionally reliably in practice.

Expedient refinements of the device according to the invention are indicated by the subclaims.

A particular advantage of the invention, is that no toothed parts have to be used. Such a device is extremely well suited for applications having relatively low transmission ratios and high desired displacement speeds of the thrust element.

Primarily, according to the invention, the thrust element is to be designed as a tube which engages over the planet rollers and the drive device of the planet roller carrier. However, it is also possible to design the thrust element as a rod enclosed by the planet rollers. In this case the carrier as a whole, that is to say also in its drive region, must be implemented to be hollow at the center, just like the drive device, in order to be able to ensure free movement of the thrust element designed as a rod.

In the case of the device according to the invention, it should be emphasized as particularly advantageous that the thrust element can be moved out over a distance over which previously no guide element needs to be present. In this way, the thrust element operates in accordance with the principle of free advance, comparable with the principle of bridge building being carried out with free advance, or with moving a piston out of a hydraulic cylinder.

BRIEF DESCRIPTION OF THE DRAWINGS

An exemplary embodiment of the invention is illustrated in the drawing, in which FIG. 1 shows a longitudinal section through a drive device having a hollow thrust element and a driven planet roller carrier, FIG. 2 shows a section through the drive device along the line II—II in FIG. 1.

DETAILED DESCRIPTION OF THE PREFERRED EMBODIMENT

Figure 4:
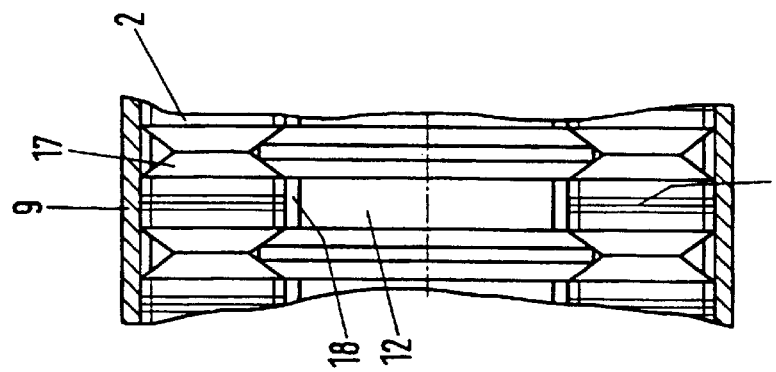
FIG. 4 shows a detail IV of the device according to FIG. 3 with a bearing element of alternative design.

In the case of an embodiment of the drive device according to FIGS. 1 and 2, a carrier having planet rollers 2 that are fixed axially therein and are rotatably mounted is connected in a rotationally fixed manner to a drive shaft 3. In this case, the drive shaft 3 is formed by the output drive shaft of an electric motor 4. The drive shaft 3 rotates in the axle of the carrier 1.

The carrier 1 is mounted and fixed axially via a shaft 5 having rolling-contact bearings 6 which are drawn over its outer circumference and are supported in a bearing ring 7 that is firmly connected to the electric motor 4.

Figure 3:
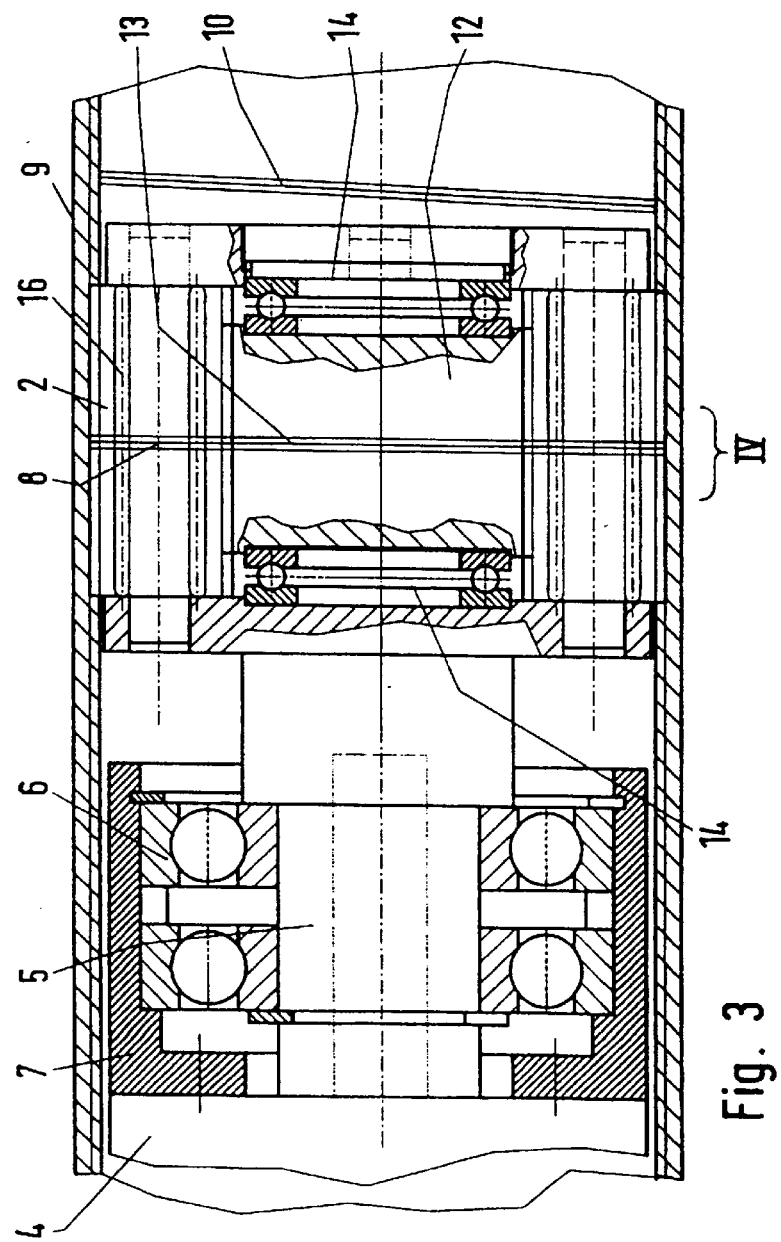
FIG. 3 shows a longitudinal section through a drive device in an alternative embodiment to that according to FIG. 1.

In the case of the embodiments according to FIGS. 1 to 3, the planet rollers 2 are provided over their length with individual circumferential drive grooves 8, which are in each case arranged alongside one another in planes aligned at right angles to the axis of the planet rollers 2.

The planet rollers 2 enclose a thrust element designed as a rod 9. The rod 9 has a groove 10 which runs in the manner of a thread and in which the planet rollers 2 engage by way of their drive grooves 8.

In the case of a carrier 1 that is driven by the electric motor 4, the planet rollers 2 roll in the mating groove 10 of the rod 9 via their drive grooves 8, and they displace this rod axially with an appropriate transmission ratio in accordance with the pitch of the thread-like groove 10 in relation to the drive speed of the electric motor.

In the embodiment according to FIGS. 1 and 2, the planet rollers 2 are fixed axially via annular discs 11, which are provided in a freely rotatable manner between the front sides of the planet roller 2 and the carrier 1.

Should slip occur temporarily between a planet roller 2 and the rod 9, this changes nothing in the precise transmission ratio between drive speed of the electric motor and axial displacement travel of the rod 9; rather all this means is that, instead of the usual rolling friction between the relevant planet roller 2 and the rod 9, sliding friction occurs during this time. This may be compared with the situation in which, with the carrier 1 rotating, nonrotation of the planet rollers 2 about their axes is assumed. In such a case, the carrier 1 with the stationary planet rollers 2 would act like a screw in a nut formed by the rod 9.

In relation to the planet rollers 2 with the drive grooves 8, it should further be noted that the grooves 8 of the individual planet rollers 2 must be appropriately offset in the longitudinal direction of the pitch of the thread turn inside the rod 9 if only one thread turn is provided in the rod 9.

The embodiment according to FIG. 3 differs from that according to FIGS. 1 and 2 only by a different type of axial fixing and mounting of the planet rollers 2 in the carrier 1, on the one hand, and of the carrier 1 with respect to the bearing ring 7, on the other hand. Provided radially inside the circulation path of the planet rollers 2 is a bearing element 12, which is rotatable about the axle of the carrier 1 and is provided with a circularly cylindrical outer surface. This bearing element 12 is provided with circumferential grooves 13, in which the planet rollers 2 engage by way of their drive grooves 8. As a result of the mutual engagement of the drive grooves 8 of the planet rollers 2 and of the grooves 13 of the bearing element 12, the planet rollers 2 can be fixed axially. This occurs as a result of the fact that the bearing element 12, which is freely rotatable about the axis of the carrier 1, is supported in a defined manner within the carrier 1 via axis rolling-contact bearings 14. The planet rollers 2 are rotatably mounted on pins of the carrier 1 via needle bearings 16.

According to the embodiment of FIG. 4, the axial support of the planet rollers 2 on the bearing element 12 can be achieved via bearing grooves that are separate from the drive grooves 8 of the planet rollers 2. Such bearing grooves 17 are in each case deeper than the drive grooves 8 and are located, in the planet rollers 2, in regions provided axially between the drive grooves 8. If the planet rollers 2 have special bearing grooves 17, then the bearing element 12 is provided only with permanently assigned grooves 18, that is to say in this case the drive grooves 8 do not roll in corresponding mating grooves in the bearing element.

The shaft 5 of the carrier 1 is accommodated radially on the inside by the rolling-contact bearings 6 which, on the outside, are radially guided and fixed in the bearing ring 7 of the motor 4. The shaft 5 has a blind bore 15, in which the output drive shaft of an electric motor 4 can engage in a positive and/or non-positive manner in order to drive this shaft 5.

What is claimed is:

1. A device having a motor for converting rotary motion into axial motion comprising:
   a) a hollow cylindrical thrust element;
   b) a carrier having an axis and disposed within said thrust element;
   c) at least two planet rollers held circumferentially at equal spacings and being axially fixed and rotatably mounted within said carrier, and having axes parallel to the direction of drive of said thrust element extending through the centers of rotation of said rollers;
   d) a drive shaft connected to the motor and to said carrier for rotating said planet rollers, about said carrier axis;
   e) drive grooves disposed on said planet rollers in which each drive groove lies in a plane perpendicular to said axes of said planet rollers; and
   f) at least one thread-like groove formed on the interior surface of said thrust element for engaging with the drive grooves of said planet rollers, wherein when said planet rollers rotate, they drive said thrust element axially;
   g) a cylindrically shaped bearing element axially fixed inside said rollers wherein said bearing element includes circumferential grooves.

2. The device as claimed in claim 1, further comprising a bearing ring disposed within said thrust element, and said shaft supported within said bearing ring.

3. The device as claimed in claim 1, wherein said circumferential grooves on said bearing element engage with said drive grooves disposed on said planet rollers.

4. The device as claimed in claim 1, wherein said bearing element is rotatably supported with respect to the shaft.

5. The device as claimed in claim 1, wherein said planet rollers include bearing grooves located in regions provided axially between regions having said drive grooves.

6. A device having an electric motor for converting rotary motion into axial motion comprising:
   a) a hollow cylindrical thrust element;
   b) a carrier having an axis and disposed within said thrust element;
   c) at least two planet rollers held circumferentially at equal spacings and being axially fixed in a plane perpendicular to the carrier axis and rotatably mounted within said carrier, and having axes parallel to the direction of the drive of said thrust element extending through the centers of rotation of said rollers;
   d) a drive shaft connected to the motor and fixed to said carrier for rotating said planet rollers, about said carrier axis;
   e) a plurality of drive grooves disposed on said planet rollers in which each drive groove lies in a plane perpendicular to said axes of said planet rollers; and
   f) at least one thread-like groove formed in the interior surface of said thrust element for engaging with the drive grooves of said planet rollers, wherein when said planet rollers rotate, they drive said thrust element axially;
   g) a bearing ring fixed to the motor and together with the motor disposed within said thrust element;
   h) a series of bearings placed inside said bearing ring; and
   i) a shaft housed within said bearings wherein said shaft fixes said carrier to said drive shaft so that the motor, disposed along said carrier axis, drives said drive shaft which turns said carrier, turning said planet rollers so that said drive grooves on said planet rollers match with said at least one thread-like groove in said thrust element, driving said thrust element axially along said carrier axis.

* * * * *